Oct. 1, 1940.   R. ERBAN   2,216,190
POWER TRANSMISSION
Filed July 23, 1935    2 Sheets-Sheet 2

INVENTOR,
Richard Erban,
BY
ATTORNEY.

Patented Oct. 1, 1940

2,216,190

UNITED STATES PATENT OFFICE 2,216,190

POWER TRANSMISSION

Richard Erban, New York, N. Y., assignor to Erban Patents Corporation, New York, N. Y., a corporation of New York Application July 23, 1935, Serial No. 32,694

4 Claims. (Cl. 74—284)

My present invention relates generally to a power transmission that is adapted to give a relatively high speed increase and more particularly to such a transmission wherein the speed increase is variable.

I have herein illustrated my invention as devised and constructed to drive a high speed apparatus of the centrifugal blower type wherein two characteristics must be particularly provided for, namely, (a) the apparatus becomes more effective in its operation as the speed increases and therefore is generally operated at a high speed; and, (b) the power required increases with the speed.

It is therefore one of the objects of my invention to provide a variable transmission wherein the efficiency of the transmission will increase as its ratio increases and will be at its maximum at top speed.

It is a further object of my invention to provide a variable transmission wherein its capability to transmit power with increasing speeds corresponds as closely as possible to the increasing power requirements of the apparatus operated thereby.

Where the transmission is to be employed, as for example, in supercharging the motors of automobiles, flying machines and the like, the question of size and weight is of primary importance, and in automobiles the question of cost is also a very determining factor.

Therefore, it is a further object of my invention to provide a variable transmission for operating centrifugacl blowers, particularly for supercharging purposes, wherein the weight and size of the transmission is reduced without any decrease in its effectiveness in meeting the requirements for supercharging, and this objective I attain, at least in part, by the attainment of the objects above set forth.

I have illustrated in the drawings one embodiment of my invention for the attainment of these and other objectives not hereinabove specifically pointed out, and in this embodiment the transmission is shown as comprising two units, one of which is variable and serves to control the ratio of transmission of the other. The other unit, which is herein disclosed as of planetary type, is generally designed and devised so as to give a speed increasing ratio always in excess of that which is required and slightly in excess of that which is required at top speed and always to do this with a relatively high efficiency.

The variable unit itself is so devised, designed and integrated with the planetary unit as to permit of the employment of a variable unit of a conventional type, and of a size required for handling only a small part of the power passing through the transmission even at high speeds, without causing any substantial decrease in the efficiency of the transmission as a whole.

In the embodiments herein disclosed, the output shaft of the planetary which is also the output shaft of the transmission, is taken off the innermost member of the planetary and the input power to the transmission is applied to the intermediate element of the planetary, and the third or outside element of the planetary is adapted to rotate, under control of the variable unit; it will be understood, however, that this arrangement may be modified without departing from the scope of my invention.

For the attainment of another of the objects of my invention, I have one element of the variable unit in driving connection with the outer member of the planetary unit and another member of the variable unit in driving connection with the input power shaft of the transmission so that the power flow through the variable unit is from the outer member of the planetary to one member of the variable unit, then to another member of the variable unit, and from this member of the variable unit back to the input power shaft.

For the attainment of these objects and such other objects as may hereinafter appear or be pointed out, I have illustrated several embodiments of my invention in the drawings, wherein.

Figure 1:
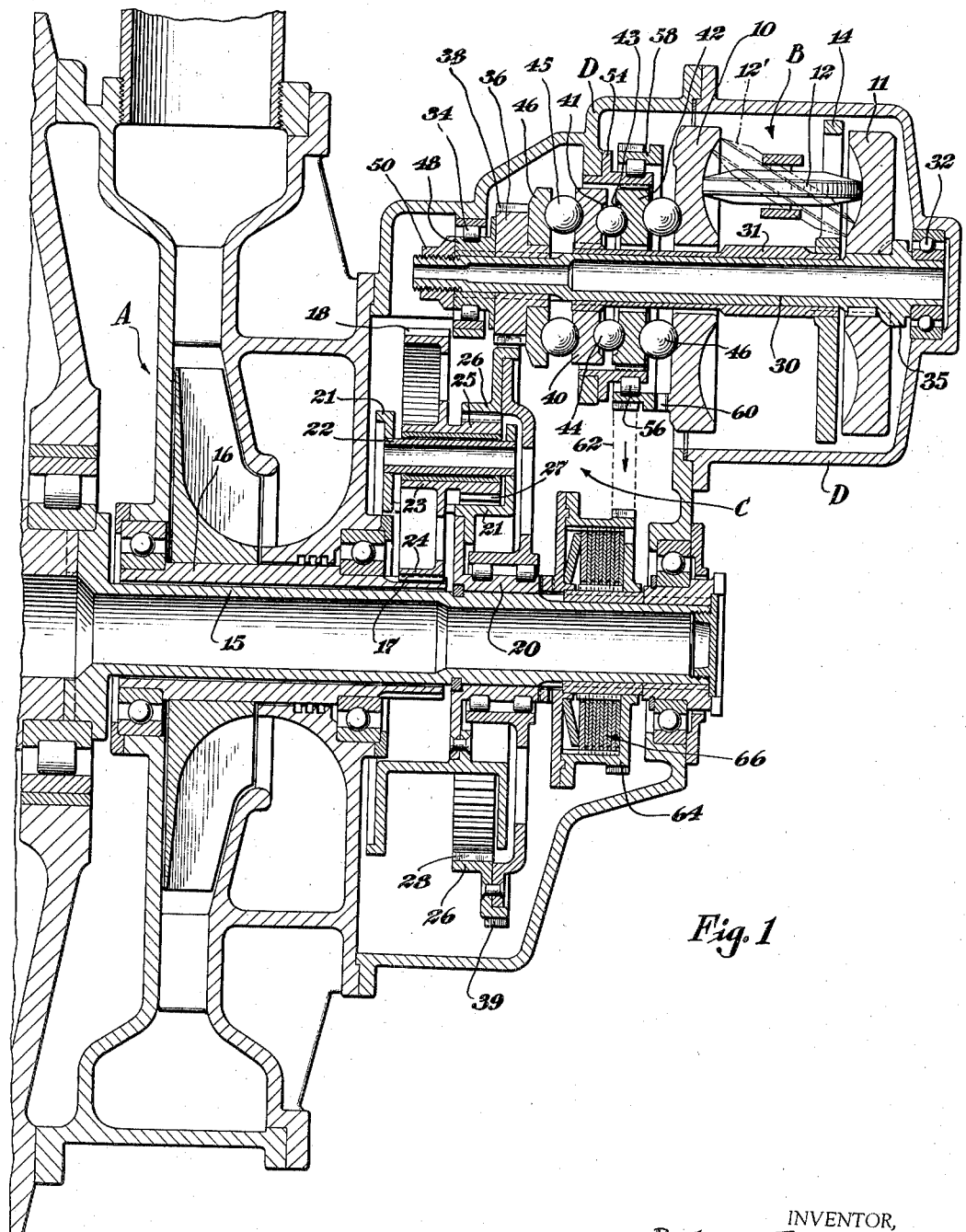
Figure 1 is a largely diagrammatic view in section through one form of variable speed transmission constructed in accordance with my invention and driving an associated centrifugal blower mechanism.

As before stated, my transmission in general comprises a planetary gear and a variable ratio transmission unit hereinafter always to be referred to as the "variable unit," so associated that under the most usual condition of operation the main part of the power passes through the planetary gear and only a fraction through the variable unit. To attain this end the innermost element of the planetary is connected to the driven shaft, and its two other elements to the main drive shaft and the variable unit respectively in such a manner that said two elements turn in the same direction. The other side of the variable unit is also connected to the main drive shaft. I have found that the best results are obtained by connecting the main drive shaft to the middle element of the planetary.

The principles involved will be better understood as the detailed description proceeds, but it is believed advisable to preface such description by a brief discussion of the advantages attainable by the use of my invention.

It is an important feature of my transmission, that while the highest speed of the driven shaft may be a multiple of the speed of the main driving shaft, the speed of the variable unit corresponding to this point of highest speed of the driven shaft is at its lowest point, and consequently the power transmitted by said variable unit is very low; it may be only 5% of the total power or even less.

As the speed of the driven shaft decreases, that of the variable unit increases, but since the total power also decreases, the amount of power transmitted through the variable unit never becomes more than a fraction of the maximum power required by the blower. To give figures from actual practice, in a transmission, designed for a range of speed ratios in which the speed of the driven shaft varies from 12 to 7 times that of the drive shaft, and used with an airplane engine supercharger consuming 70 horse power at its highest speed, the variable unit carries only 5.8 horse power, or 8.3% at the 12:1 ratio, and not over 12.1 horse power, or 17.2% at the 7:1 ratio.

Since airplane blowers are normally operated under high speed conditions, and they are run at low speed only at the take off and part of the climb, so that the time for low speed operation is only a small fraction of the total flying time, the size of the variable unit may be proportioned to the high speed requirements and the capacity of the variable unit to stand an overload for short periods be depended on for low speed requirements. It is found possible with my invention to effect a reduction in weight of the variable transmission in comparison to variable transmissions of heretofore known type, that amount to 1 for my invention as compared to 10 for the customary arrangement.

Before proceeding to the detailed description of the invention, it will be emphasized that one of the important features thereof is that of having the variably controlled element of the planetary rotating at a speed which is slow as compared with the speed of either the driving or the driven shaft, and that as the speed of the variable unit decreases, the speed of the driven shaft increases. It is this feature that permits the use of a small variable unit in the control of an amount of power that would otherwise require a unit from 5 to 10 times its capacity.

The advantages of a small unit, besides a reduction in weight, obviously also include reduced cost.

Upon viewing Figure 1 of the drawings it will be observed that I have there illustrated, in connection with an airplane motor, a blower of the type used on airplanes, denoted by A, and shown as driven by a transmission comprising a variable unit (to which, as a whole, reference character B has been applied), associated with a planetary unit (to which, as a whole, reference character C has been applied) in a manner to be more fully pointed out in detail.

The planetary unit C is illustrated as of the gear type, although it will be understood that it may be of other types, and is driven by the input shaft 15, (which may be the main shaft of the airplane engine, as shown, or a shaft driven therefrom), to transmit the power thereof to the output or blower shaft 16, by the arrangement which I will now describe.

The input power shaft 15 is keyed to the hub 20 of the planetary carrier 21, of planetary C, which is provided with a set of shafts 22, upon each of which is rotatably journalled a two stage planetary gear wheel 23. For the sake of clearness only one wheel 23 and one shaft 22 have been shown. The larger gear 24 of the planetary wheel 23 is shown as driving the output shaft 16 by means of the gear teeth 17, on the inner end of the output shaft 16, meshing with the external gear teeth 18 carried by 24. The smaller gear 25 of the planetary 23 is shown in driving engagement with the outer gear ring 26 of the planetary transmission, the gear 25 having teeth 27 and the gear 26, internal teeth 28.

It will be understood that by the arrangement thus far described, the power shaft 15 will cause the planetary carrier 21 to revolve about the axis of the input shaft 15. This causes a revolving movement, about the axis of shaft 15, of the shafts 22 carrying planetary gears 23. If the outer gear ring 26 were held stationary, it will be understood that due to the engagement therewith of the smaller diameter gears 25, of the two-stage planetary gears 23, the latter would be caused to rotate about their carrier shafts 22, and thus transmit motion to the output shaft 16 to drive the blower, because of the interengagement of teeth 18 of gear 24 with teeth 17 of shaft 16. The speed ratio at which the blower will be driven will be determined by the relative radii of the gears in mesh.

I will now describe an arrangement whereby I accomplish the following added results: (a) the ratio at which the planetary operates is controlled by a variable transmission, and (b) the power is so distributed that only a small fraction of the power is delivered to operate the variable unit for this controlling purposes, and therefore the variable unit can be made of a size and of a capacity which is only that required to take care only of this fraction of the power delivered by the input shaft.

This variable unit, denoted as a whole by B, comprises a pair of toric races 10 and 11, having therebetween a system of rollers 12, only one of which is shown for the sake of clearness. The rollers are in adhesive contact with the races, and are kept so under all conditions of load by an arrangement to be hereinafter described, and serve to transmit power between the races. As shown in full lines in Figure 1, the roller 12 is in such a position that the speeds of the races must be the same. If the roller is shifted from the full line position to other positions the speeds of the races will be different. If the roller assumes the dotted line position 12', for instance, the race 11 must rotate at a speed higher than that of race 10, assuming that there is no slippage of the rollers 12 in relation to the races.

Rollers 12 are carried by a frame 14 shown as mounted on a sleeve 31 surrounding shaft 30, and are rotatable therein as well as having their axes tiltable in relation thereto for purposes of speed ratio adjustment. The sleeve 31 and consequently the frame 14 are capable of limited rotary movement, such movement being limited by the movements of a member 40 to be hereinafter described, and such movement taking place in response to the effect of torques passing through rollers 12 on the frame 14.

The details of the mechanism for adjusting the inclination of the rollers has not been illustrated, for the sake of clarity. Such constructions are well-known; by way of example, I may refer to U. S. Patent 1,999,543.

Race 11 is shown as keyed to shaft 30, suitably journalled in the frame D of the device, as indicated at 32 and 34, and a gear 36 having teeth 38 thereon adapted to mesh with external teeth 39 on the rim of gear 26, heretofore mentioned in connection with the planetary C, is also keyed to the shaft 30. Race 11 is further shown as held against axial movement by a collar 35 on shaft 30. Whereas race 11 is shown as keyed to shaft 30, race 10 is shown as mounted so as to be not merely rotatable in relation to shaft 30, and to the sleeve 31 surrounding it, but to be axially movable as well, and by providing a sufficient clearance between the hub of this race and the sleeve 31, it is also adapted for limited angular movement in relation thereto, such angular movement permitting the race to adjust itself in relation to the system.

Intermediate the race 10 and the gear 36 is a system of parts of the type customarily known as a "torque-loader," the function of which is to secure the adhesive driving contact between the races 10 and 11 and rollers 12 under all conditions of load. This it accomplishes by generating an axial pressure on race 10, increasing as the torque passing through the system increases, for causing the race 10 to move toward race 11, and exert pressure on the intermediate rollers 12. This system may comprise a member 40 fixedly associated, as by a key, with the sleeve 31, and a member 42 opposed thereto, and mounted in the frame D so as to be slidable but not rotatable in relation thereto. The member 42 is provided with a central opening permitting passage of sleeve 31 therethrough and clearance is provided so as to permit self-aligning angular movement of member 42 in relation to sleeve 31. Each of members 40 and 42 is provided with inclined pressure surfaces, those of members 40 being indicated at 41, and those of members 42 at 43. These surfaces are arranged in pairs, the surfaces of each pair being oppositely inclined so as to form a wedge-shaped depression, and opposed to each pair of surfaces of member 40 is a complementary pair of surfaces on member 42. Within each of the hollows so formed is located a pressure element 44, shown as in the form of a ball. When relative rotation takes place between members 40 and 42, as when spiders 14 move under the action of torques transmitted by rollers 12 these elements 44 will ride up on the opposed inclined surfaces 41 and 43 and will cause relative axial movement between members 40 and 42. The details of a torque loader arrangement similar to the one herein disclosed are more fully illustrated and described in U. S. Patent 1,585,140.

Member 40 is fixed in axial relation to race 11, as will be more fully explained; and the result of relative rotation of members 40 and 42 is an axial movement of member 42 toward race 11, and a resulting axial movement of race 10 toward race 11; the movement of race 10 being effected by the balls 46 interposed between member 42 and race 10, and serving to transmit axial pressure and movement to race 10, yet leaving the latter free to rotate.

As shown in Figure 1, member 40 is prevented from moving away from race 11 by a ball bearing comprising balls 45 and a race 46, the latter abutting against gear 36, which in turn is held in place against axial displacement away from race 11 by any suitable arrangement, such as the bearing race 48 and the nut 50.

In order to transmit power between race 10 and the input shaft 15, I show a sprocket gear 58, journalled in bearings 56 carried by an extension 54 of the casing D; and this sprocket gear has a driving connection at 60 with the race 10, and by means of a sprocket chain 62, with a gear 64, carried by the casing of a slip clutch 66, the purpose of which is to limit the torques passing through the transmissions B and C, for which purpose it is arranged to transmit torques up to a predetermined value and to slip when the torques exceed this value.

With the aid of the foregoing description the operation of my device will now be understood, and its advantages will become clear.

As before stated, if the outer planetary member 26 were held stationary while the intermediate planetary member 21 were rotated, the driven shaft 16 would be rotated; and its direction of rotation would be the same as that of member 21, while its speed of rotation would be higher. If now we assume that the outer member 26 is allowed to rotate in the same direction as and at a speed of rotation equal to that of the intermediate member 21, the gear 25 no longer rolls within 26 and the wheel 23 is held fixed on its shaft 22, so that the driven shaft 16 now turns with a speed of rotation identical with that of driving shaft 15, and the direction of rotation is also the same for both shafts.

If, starting with this speed and direction of rotation of the gear 26, the latter is now slowed down, a speeding up of the driven shaft 16 results. It is therefore obvious that the lower the ratio setting of the variable unit is, that is, the lower the speed of the driven gear 36 of the variable unit, the faster the rotation of the driven shaft 16.

It follows that the higher the speed at which it is desired to drive the blower A, and consequently the greater the power demands made upon it, the less the speed, and consequently the lower the relative power consumption of the variable unit B. The efficiency of power transmission therefore increases as the power output of the blower increases.

Figure 2:
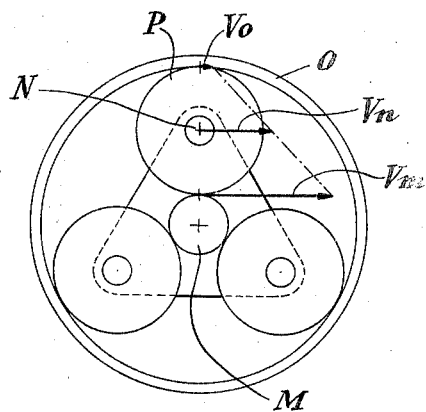
Figures 2 and 3 are diagrams showing the relations in the velocities of the different parts of the transmission, each figure relating to a particular setting of the ratio of the transmission.
Figure 3:
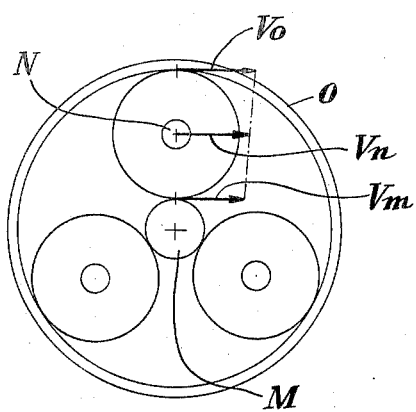

A graphical representation of the velocity relations will be found in Figures 2 and 3, in which O represents the outer member of the planetary, P the planetaries and N the intermediate member or planetary carrier of a planetary gear, while M represents the driven member. For the sake of simplicity the planetary gear corresponding to wheel 23 is shown as having only one stage. If a linear speed $V_o$ is impressed on the member C, and a linear speed $V_n$, on the planetary carrier N, then the speed $V_m$ will represent the linear speed imparted to the periphery of the driven member M, $V_m$ being determined geometrically by the fact that the points of the velocity arrows $V_o$, $V_n$ and $V_m$ must all lie in a straight line. $V_o$ and $V_n$ being given, $V_m$ is readily found.

A comparison of Figures 2 and 3 will show the effect of decrease in the driven speed, as the speed of the outer member, determined by the variable transmission, is increased and vice versa. It will further be obvious that the rate of increase of the speed ratio increases as Vo is diminished.

Figure 4:
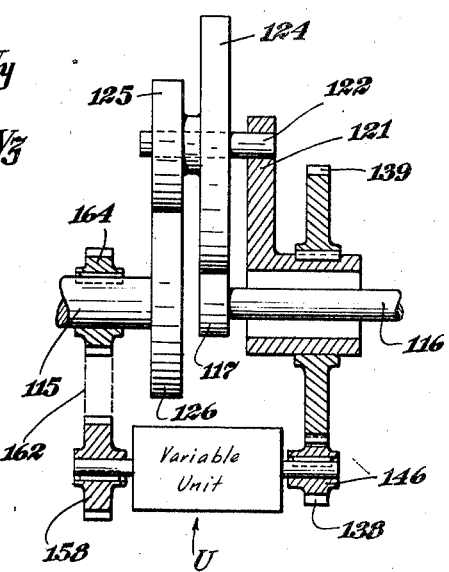
Figure 4 is a side elevation partly in section of another embodiment of my invention, in which the planetary is of the external type.

In Figure 4 I have shown a modified form of transmission in which an external planetary arrangement is used instead of the internal planetary arrangement of Figure 1. 115 indicates the driving shaft, carrying gear 126, and 116 indicates the driven shaft, carrying gear 117. The planetary carrier is 121; and 122 is indicative of a set of carrier shafts, each having a unitary double gear comprising gears 124 and 125 carried thereby. The variable unit is driven from the shaft 115 by chain 162 passing over sprockets 158 and 164, associated respectively with the variable transmission U and the drive shaft 115, and is connected to the planetary carrier 121 by gear 139 on the latter, meshing with gear 146 associated with the variable unit U.

It will be observed that whereas in Figure 1 the rotational speed of the planetary carrier 21 is constant, or rather equal to the drive shaft speed, in the construction of Figure 4, the planetary carrier is variably driven, while the rotational speed of gear 126 is constant, or rather the same as the drive shaft speed.

Figure 5:
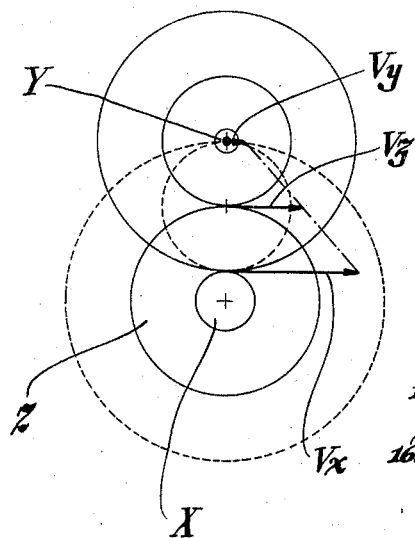
Figure 5 is a diagram, similar to the diagrams of Figures 2 and 3, showing the relation of the velocities in the embodiment of Figure 4.

The velocity diagram for this construction is shown in Figure 5. In this diagram Z indicates the driving member 126, Y the planetary gear shaft 122, and X the driven gear 117. Vz, the linear peripheral speed of 126 may be assumed to be constant and Vy, the linear speed of shafts 122, is controlled by the variable unit. Vx, the linear peripheral speed of the driven gear 117 is again determined by the geometrical construction used in Figures 2 and 3. Again we observe that Vy, proportional to the output speed of the variable unit, is small compared to the load speed Vx, and also that decrease of Vy causes an increase of Vx, the ratio of increase itself increasing as Vy becomes smaller.

The dotted circles in Figure 5 indicate points of correspondence between the diagrams of Figure 5 and Figure 2, and the constructions to which they relate. Therefrom it will appear that the axis of shaft 122 of Figure 4 corresponds to the point of contact between the outer gear 26 of Figure 1 and the planetary pinions 25. To show this equivalency I have indicated in Figure 5 in dotted lines a large circle, intended to represent the outer gear 26 of Figure 1.

The contact point between gears 125 and 126 of Figure 4 corresponds to the shafts 22 carrying the planetaries 25 of Figure 1.

The contact point between gears 124 and 117 of Figure 4 corresponds to the contact point of gears 24 and gear teeth 17 of driven shaft 16.

It will therefore be apparant that both planetary constructions embody the same concept, and this concept may be referred to the construction of Figure 1. In this figure the outer gear 26 may be termed the outermost member, and the gear teeth 17 or sun gear of the planetary, the innermost member, while the compound planetaries 23 may be termed the intermediate member.

This terminology is the one that has been adopted in the claims, and, because of the equivalence of the constructions of Figures 1 and 4, as hereinabove pointed out, has been used in reference to either of them.

In defining the invention in the claims it has furthermore been found necessary to use the term "speed of free rotation" as applied to the member controlled by the variable unit. This may be defined as the speed that the said controlled member would have if freed from the control of the variable unit and the driven shaft were held stationary, so that the speed of the controlled member would be determined solely by the speed of rotation of the drive shaft 15.

While I have herein disclosed two embodiments of my invention it will be understood that the same may be embodied in many other forms without departing from the spirit thereof as will be obvious to those skilled in the art, and that the disclosure herein is not intended to be limiting in any sense, and that I do not limit myself in any way other than as called for by the prior art.

Having thus described my invention and illustrated its use, what I claim as new and desire to secure by Letters Patent is:

1. For use in a supercharger having: a rotary impeller; a drive shaft; a train of gears connecting the drive shaft to the impeller to transmit power to rotate the impeller, the train including planetary and orbit gears; means to retain the gears of said train in mesh; a variable speed transmission of the toric race and roller type; a power transmitting connection between said variable transmission and said drive shaft, the power transmitted by the variable transmission being ultimately delivered to said impeller; and means to increase the speed ratio of said train of gears in response to decreased power transmitted by said variable transmission, said means including a constant speed ratio change connection between one of said orbit gears and said variable transmission whereby the effective power control by said variable speed transmission is increased relatively to the power absorbed by said impeller.

2. For use in a supercharger having: a rotary impeller; a drive shaft; a train of gears connecting the drive shaft to the impeller to transmit power to rotate the impeller, the train including a planetary gear and rotary carrier therefor and also including driving and driven gears; means to retain the gears of said train in mesh; a variable speed transmission; a power transmitting connection between said drive shaft and said variable transmission, the power transmitted by the variable transmission being ultimately delivered to said impeller; and means to increase the speed ratio of said train of gears in response to decreased power transmitted by said variable transmission, said means including constant speed ratio change elements whereby the effective power control by said variable speed transmission is increased relatively to the power absorbed by said impeller.

3. For use in a rotary pump construction having: a rotary impeller; a drive shaft, a train of gears connecting the drive shaft to the impeller to transmit power to rotate the impeller; means to retain the gears of said train in mesh; a variable speed transmission; a power transmitting connection between said variable transmission and said drive shaft, the power transmitted by the variable transmission being ultimately delivered to said impeller; and means to increase the speed ratio of said train of gears in response to decreased power transmitted by said variable transmission, said means including constant speed ratio change elements driven by a gear of said train of gears whereby the effective power control by said variable speed transmission is increased relatively to the power absorbed by said impeller.

4. For use in a rotary pump construction having: a rotary impeller; a drive shaft, a train of gears connecting the drive shaft to the impeller to transmit power to rotate the impeller; means to retain the gears of said train in mesh; a variable speed transmission of the race and roller type; a power feed back connection between said variable transmission and said drive shaft, the power transmitted by the variable transmission being ultimately delivered to said impeller; a clutch included in said power feed back connection; and means to increase the speed ratio of said train of gears in response to decreased power transmitted by said variable transmission.

RICHARD ERBAN.